United States Patent
Hussain et al.

(10) Patent No.: US 9,509,794 B2
(45) Date of Patent: Nov. 29, 2016

(54) SYSTEM AND APPARATUS FOR MEASURING APPLICATION-SPECIFIC CONSISTENCY OF CHECK-IN-BASED USER LOCATION DATA STREAMS

(71) Applicant: Palo Alto Research Center Incorporated, Palo Alto, CA (US)

(72) Inventors: Muzammil Hussain, Bangalore (IN); Rui Zhang, San Francisco, CA (US); Oliver Brdiczka, Mountain View, CA (US); Rong Zhou, San Jose, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 560 days.

(21) Appl. No.: 13/958,423

(22) Filed: Aug. 2, 2013

(65) Prior Publication Data
US 2015/0039672 A1   Feb. 5, 2015

(51) Int. Cl.
*G06F 15/16* (2006.01)
*H04L 29/08* (2006.01)

(52) U.S. Cl.
CPC .................. *H04L 67/2819* (2013.01)

(58) Field of Classification Search
CPC . H04L 67/2819; H04L 47/70; H04L 49/252; H04L 51/34; H04L 63/02; H04L 63/0428; H04L 63/08; H04L 9/32; H04L 65/4015; H04L 67/38; H04L 65/403; H04L 12/1813; H04L 65/4038; H04L 12/1822; H04L 67/1004; H04L 67/101; H04J 14/0227; H04N 7/15; H04M 3/56
USPC .......................................................... 709/202
See application file for complete search history.

(56) References Cited

U.S. PATENT DOCUMENTS

| | | | | |
|---|---|---|---|---|
| 6,185,549 B1* | 2/2001 | Rastogi | ............ | G06F 17/30539 706/45 |
| 2005/0060313 A1* | 3/2005 | Naimat | ................. | G06Q 30/02 |
| 2012/0005527 A1* | 1/2012 | Engel | .................... | H04H 60/64 714/15 |
| 2012/0233158 A1* | 9/2012 | Braginsky | .............. | H04L 67/18 707/724 |
| 2015/0193543 A1* | 7/2015 | Poliakov | ................ | G06Q 30/02 707/738 |

\* cited by examiner

*Primary Examiner* — Douglas Blair
*Assistant Examiner* — Ishrat Rashid
(74) *Attorney, Agent, or Firm* — Shun Yao; Park, Vaughan, Fleming & Dowler LLP

(57) ABSTRACT

One embodiment of the present invention provides a system for ensuring quality of a check-in stream for an application. During operation, the system initially receives a check-in stream metric for the application. The system also receives a threshold metric value for the check-in stream metric. Next, the system calculates a metric value based on the check-in stream and the received check-in stream metric for the application. The system determines whether the calculated metric value satisfies the received threshold metric value, and in response to the calculated metric value satisfying the received threshold metric value, executes the application using the check-in stream.

15 Claims, 9 Drawing Sheets

SYSTEM AND APPARATUS FOR MEASURING APPLICATION-SPECIFIC CONSISTENCY OF CHECK-IN-BASED USER LOCATION DATA STREAMS

BACKGROUND

Field

This disclosure is generally related to location check-in applications. More specifically, this disclosure is related to a method and system for ensuring a threshold level of check-in data stream quality for applications.

Related Art

Location is a vital piece of information for ubiquitous computing that enhances our everyday lives, since it is required for computers to be context-aware. For example, a smartphone should be able to detect a shop nearby and remind the user to perform a task at that shop. Moreover, computing systems can use location traces of users to infer certain characteristics of the user, such as a user's eating preferences, or what the user would like to do on the weekends. A location trace is also called a check-in stream. The location trace or check-in stream is a series of check-ins performed by a user at various locations.

Location information collected over a period of time can help a user detect serendipitous meetings with friends or like-minded individuals. One way to track locations of users of ubiquitous devices such as smartphones or tablets is to monitor the location of the user using global positioning system (GPS) or other beacon-based location systems. However, this method has a number of disadvantages. GPS puts an enormous load on the energy-constrained battery operated devices. GPS points cannot be readily translated into semantic locations like home, office, or coffee shop, especially when the user is located in cluttered environments. Lastly, there are a number of privacy concerns with GPS tracking.

Location Based Social Networks (LBSNs) such as Foursquare and Facebook Places can offer an alternative solution. With LBSNs, the user voluntarily checks in the user's location with semantic address tags like home or the name of a coffee shop or shopping mall. Since a user checks in the exact semantic location/address, the data association problem linked with GPS traces is taken care of. Moreover, the voluntary user check-in eliminates a number of privacy concerns found with GPS tracking. Alternatively, financial data, such as credit card or debit card purchases, using digital portals like Google Wallet, PayPal or Yodlee API, can offer a form of check-in information that ties the user to a place and even activity. Similarly, check-ins like gym visits, workplace sign-ons or even promotional check-ins at coffee shops or amusement parks using near field communication-enabled devices can also offer data for tracking a user's behavioral data.

However, the primary disadvantage of check-in based location tracking is the inherently sporadic nature of a user checking in their current location and activity. A user may forget to check-in his/her position or even intentionally choose not to report the current position/activity. Sparse check-in-based location traces can lead to poor performance of applications using collaborative filtering and location predictors that rely on the location traces.

SUMMARY

One embodiment of the present invention provides a system for ensuring quality of a check-in stream for an application. During operation, the system initially receives a check-in stream metric for the application. The system also receives a threshold metric value for the check-in stream metric. Next, the system calculates a metric value based on the check-in stream and the received check-in stream metric for the application. The system determines whether the calculated metric value satisfies the received threshold metric value, and in response to the calculated metric value satisfying the received threshold metric value, executes the application using the check-in stream.

In a variation on this embodiment, the check-in stream metric is calculated as a fractional value with the numerator being the number of time intervals with check-ins from the check-in stream and the denominator being the total number of time intervals for a day.

In a variation on this embodiment, the check-in stream metric is calculated as a fractional value with the numerator being the number of time intervals with check-ins from the check-in stream that match the respective venue type of the respective time intervals, and the denominator being the total number of time intervals for a day.

In a variation on this embodiment, the check-in stream metric is calculated as a fractional value with the numerator being the number of time intervals with check-ins, from the check-in stream, that include at least one pair of check-ins separated by at least a respective threshold distance associated with the respective time interval, and the denominator being the total number of time intervals for a day.

In a variation on this embodiment, the check-in stream metric is a value characterizing a time interval associated with a portion of the check-in stream In a variation on this embodiment, the check-in stream metric is calculated based on one or more of a number of intervals in a day, a set of activity categories, and the distance between individual check-ins

BRIEF DESCRIPTION OF THE FIGURES

In the figures, like reference numerals refer to the same figure elements.

DETAILED DESCRIPTION

Figure 1:
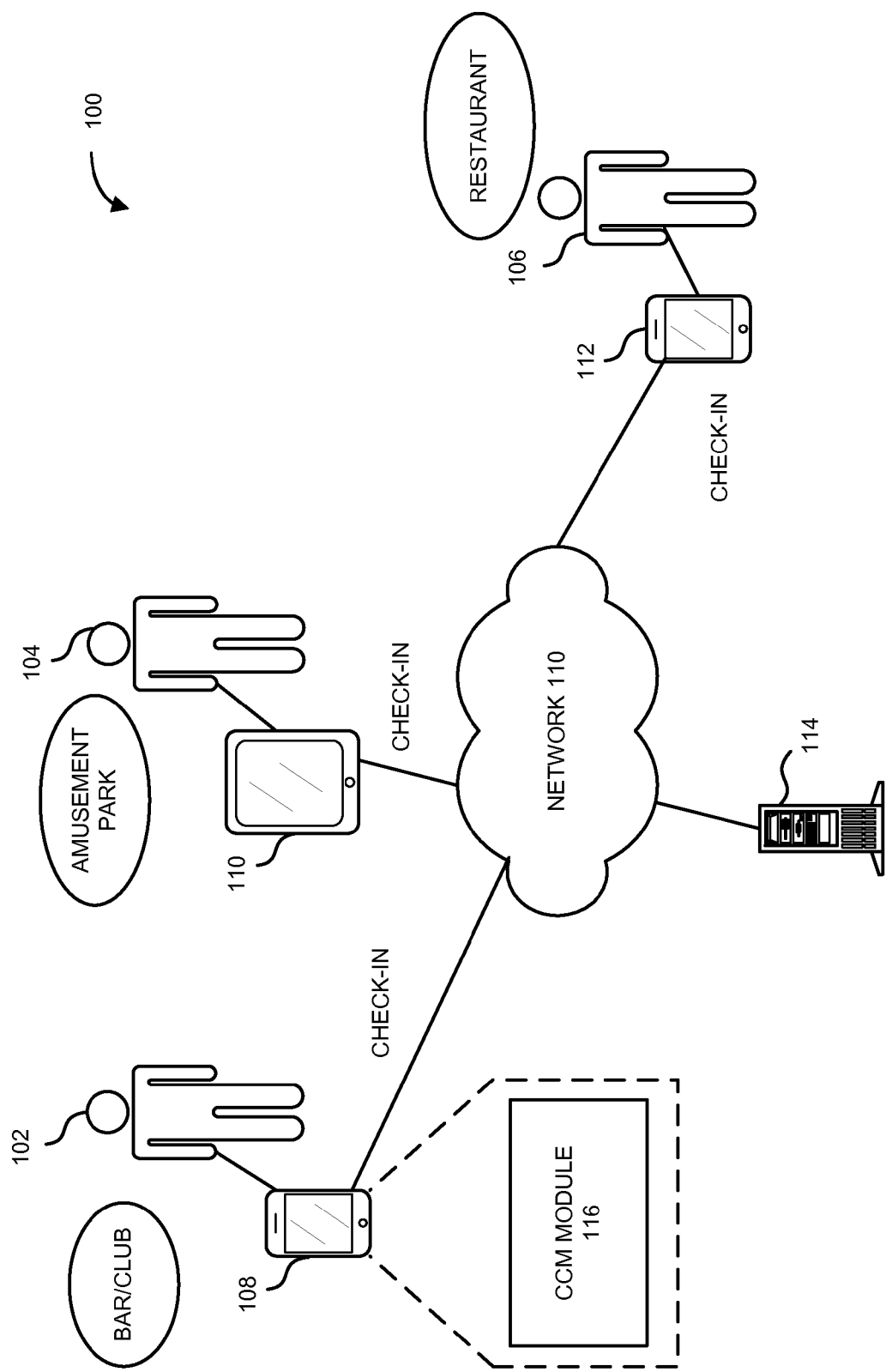
FIG. 1 presents a block diagram illustrating a check-in system with users checking in with a server, according to an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of ensuring quality for applications relying on location check-in streams by confirming that metric values characterizing the check-in streams exceed threshold requirements before allowing the applications to utilize the check-in streams. Check-in streams are a sequence of timestamps or location stamps received over specific time durations. Some of these check-in streams may be very sparse with few check-ins, while others may be dense with many check-ins. By encoding the structure of the location check-in stream into a check-in consistency metric (CCM), a CCM-based system can analyze the sparsity and characteristic structure of the check-in stream to determine whether the check-in stream is of sufficient quality and maturity for use as input to an application. The system may then use the CCM to minimize the possibility of low quality check-in data for the application, thereby improving the output quality from applications that rely on the check-in stream.

The system uses CCM to characterize the structure of the check-in data stream. Since individual users have highly personalized location traces which depend on their lifestyles and location check-in habits, the system may characterize the structures of these location traces in a variety of ways using various CCM flavors. A CCM flavor is a pattern definition for which the system may seek to match subsequences of the location trace to the predefined pattern.

The three example CCM flavors introduced in this disclosure are the 24-hour-check-in CCM flavor, the workday-check-in CCM flavor, and the mobile-user-check-in CCM flavor. These three example CCM flavors use some aspects of the user location check-in, including the time of check-in, the category of check-in location, and the physical location, for characterizing the structure of the location trace of a user. Other aspects of the user location check-ins that may also be considered for CCM flavors include the frequency of similar types of location reporting (in terms of venue location), and the arrangements of consecutive venue types of location check-ins like food-gym-office or office-gym-coffee-home.

The 24-hour-check-in CCM flavor characterizes the fraction of hours in a day that a user checks in his/her location. The workday-check-in CCM flavor characterizes the time and venue types of check-ins in a day. The mobile-user-check-in CCM flavor characterizes the distance between check-ins at various times of the day. These three flavors are discussed in greater detail below.

Note that the CCM flavors discussed herein are examples, and a domain specialist may design other CCM flavors for different applications. A domain specialist may identify factors affecting algorithm/application performance and the inherent structure of incoming location traces to design CCM flavors. The domain specialist should understand the context in which incoming location traces are used in an algorithm/application. For example, an activity recommendation application that trains on previous location traces of a user and other users who have similar interests as that user (e.g., collaborative filtering) would require a CCM flavor that is different from that for an application that clusters location traces of users into hybrid regions. Once the domain specialist defines the CCM flavor for an application that uses check-in based location traces, the system can use CCM to control the performance of the application/algorithm. The domain specialist may define a CCM threshold ($CCM_{THR}$), taking into account the desired performance accuracy of the application and the relationship between the CCM and application error.

CCM can be useful in scenarios where location-based check-in data is employed to power ubiquitous computing applications, particularly when mobile devices such as smartphones and tablets are used. A CCM-based system can continuously monitor user location data from sources like GPS traces, LBSN check-ins, digital financial transactions like the Google Wallet, and other check-in information like gym check-ins, office check-ins or coffee shop check-ins. A server-based service can provide location information of friends/relatives/like-minded people. The system can use this plethora of location-based behavioral data to drive various recommendation systems or personal digital assistants.

System Architecture

FIG. 1 presents a block diagram illustrating a check-in system 100 with users checking in with a server, according to an embodiment. In FIG. 1, users check-in using their mobile devices, and a CCM module on the mobile devices may test for quality of a check-in stream before transmitting check-in stream to a server for use by applications. In some implementations, a server receives the check-in streams directly from the client mobile devices and tests the quality of the check-in streams using a CCM module before allowing applications to use the check-in streams. Note that the type of applications operating on check-in streams are not limited to any particular type of applications, and may include recommendation systems and activity/location prediction.

As depicted in FIG. 1, users 102, 104, and 106 check-in using mobile devices 108, 110, and 112, respectively. Such users may check-in using any variety of ways. For example, a user may broadcast on the user's social network via a mobile application. The user may perform a credit card transaction at a store, or a retail establishment may also detect the user's presence via motion sensors or cameras.

In the illustrated examples, the users may check-in at various locations and times using software installed on their respective mobile devices. For example, user 102 may check-in at a bar or club. User 104 may check-in at an amusement park. User 106 may check-in at a restaurant. Their devices communicate through a network 110 with a server 114. Server 114 can be executing an application that utilizes the check-in data streams. For example, server 114 may be executing an application that examines a user's stream of Foursquare check-ins. Server 114 also analyzes the check-in streams using the various CCM flavors as described below. Note that in some implementations, the applications utilizing the check-in streams may also be executing on user's mobile devices.

A CCM-based system can employ a CCM module 116 that is resident on the mobile device (or on a remote server) to ensure that the location-based check-in data streams meet the performance requirements for various algorithms/applications. The CCM module can execute as a service. The CCM module offers two primary benefits. First, system 100 can use the CCM module to determine if the location traces are mature enough for use in the application. This is important when a user starts using the mobile device and system 100 starts collecting the user's location-based behavioral data. CCM can determine such cold-start situations. Second, system 100 can use the CCM module to maintain quality thresholds defined by the applications.

CCM Flavors

Figure 2:
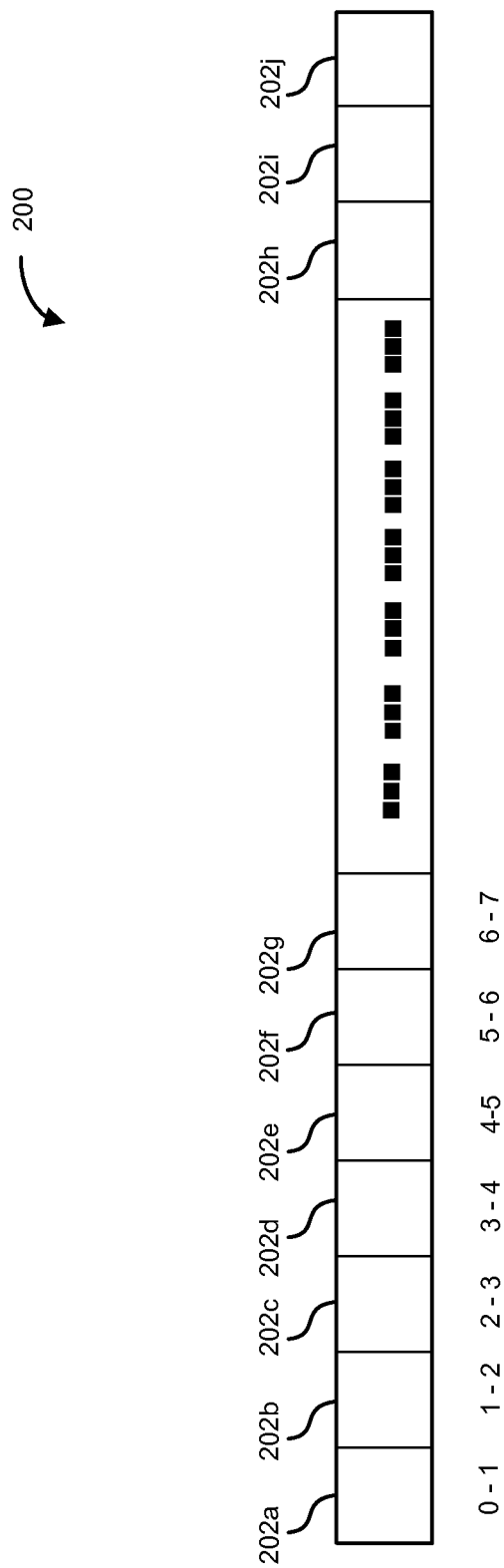
FIG. 2 presents a block diagram illustrating an exemplary 24-hour-check-in CCM flavor, according to an embodiment.

FIG. 2 presents a block diagram illustrating an exemplary 24-hour-check-in CCM flavor 200, according to an embodiment. The 24-hour-check-in CCM flavor measures the proportion of the day for which a user actively reports his/her location activity. The 24-hour-check-in CCM flavor 200 measures the fraction of hours in a day in which a user checks in the user's location. Each day is divided into 24 buckets (e.g., intervals), some of which are depicted in FIG. 2 as buckets 202a, 202b, 202c, 202d, 202e, 202f, 202g, 202h, 202i, and 202j. The hours of the day are illustrated below the buckets as "0–1," "1–2," etc. (e.g., from midnight to 1 AM, and from 1 AM to 2 AM).

System 100 computes the per-day CCM as the fraction of buckets filled out of the total number of buckets, according to the formula:

$$\text{Per-day } CCM = \frac{\text{Number of filled buckets}}{\text{Total number of buckets for the day}}$$

The formula given above is applicable to all flavors described herein. When the user checks in at least once for any interval, system 100 marks the corresponding bucket as filled. For example, if a user checks in at 3:30 am, then system 100 fills the bucket 202d. In this example, if system 100 does not fill any other buckets then system 100 computes the per-day CCM as $\frac{1}{24}$. Note that generally, the 24-hour-check-in CCM flavor may be calculated as a fractional value with the numerator being the number of time intervals with check-ins from the check-in stream and the denominator being the total number of time intervals for a day.

Figure 3:
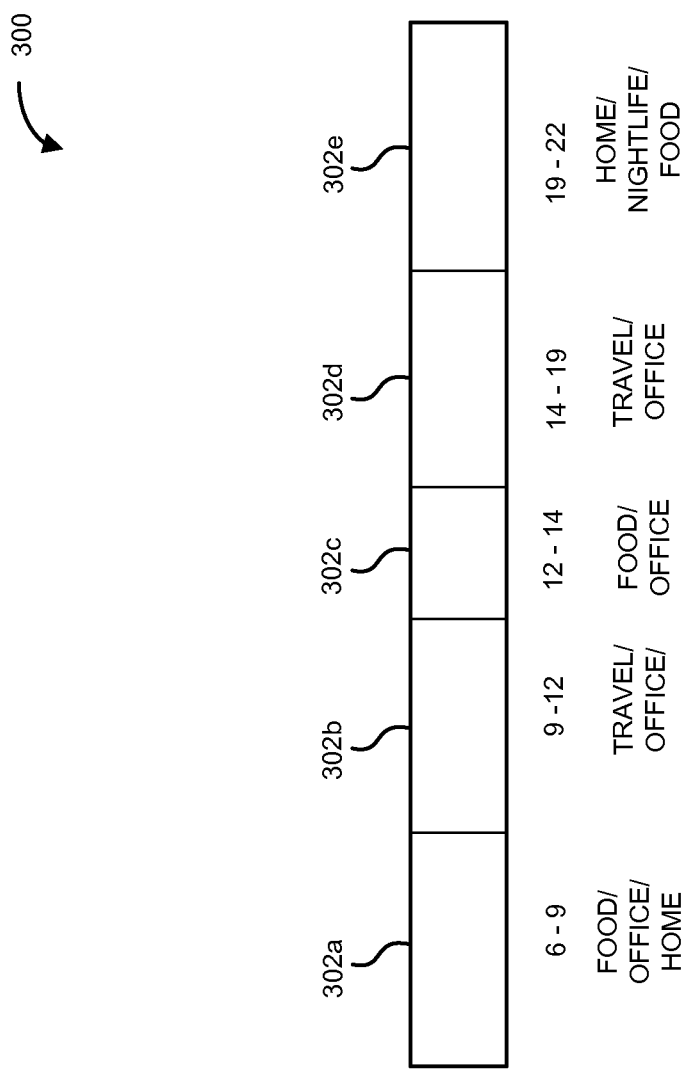
FIG. 3 presents a block diagram illustrating an exemplary workday-check-in CCM flavor, according to an embodiment.

FIG. 3 presents a block diagram illustrating an exemplary workday-check-in CCM flavor 300, according to an embodiment. The workday-check-in CCM flavor measures the consistency with which a user reports day-to-day activity. The workday-check-in CCM flavor 300 includes five buckets 302a, 302b, 302c, 302d, and 302e for specific chunks of the day, as shown in FIG. 3. However, each user check-in qualifies to fill a particular bucket not only by being in the corresponding time-slot, but also by being within the set of check-in venue types defined for the specific bucket. For example, in order to fill the third bucket 302c, a location check-in C1 should occur between 12:00 to 14:00 of the day and also be at a venue that is classified in Foursquare as a food or office location type.

Figure 4:
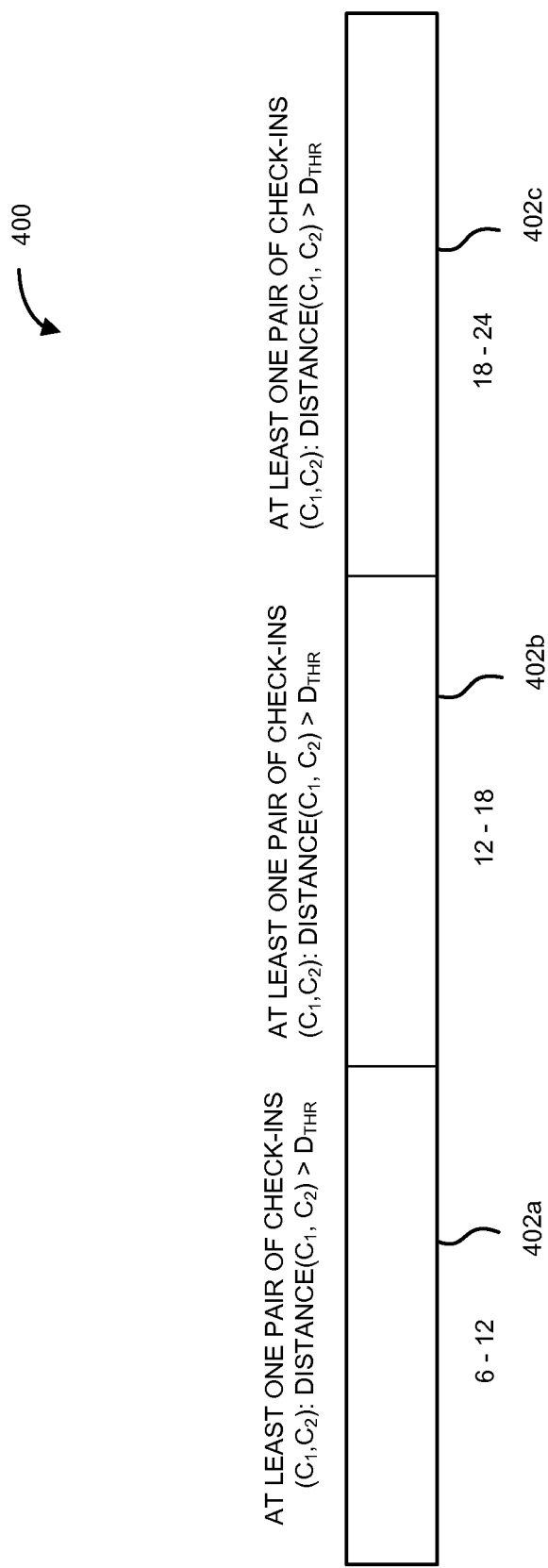
FIG. 4 presents a block diagram illustrating an exemplary mobile-user-check-in CCM flavor, according to an embodiment.

FIG. 4 presents a block diagram illustrating an exemplary mobile-user-check-in CCM flavor 400, according to an embodiment. FIG. 4 shows an example of a CCM flavor 400 that takes into account the distances between two user location check-ins. The mobile-user-check-in CCM flavor measures the consistency with which a user reports his/her location and activity that could take place consecutively but at significantly spread out locations. The mobile-user-check-in CCM flavor splits the day into three significant chunks represented by three buckets 402a, 402b, 402c for timeslots 6:00-12:00, 12:00-18:00 and 18:00-24:00, respectively. System 100 fills each bucket with a pair of check-ins. In order to fill a bucket, a pair of check-ins should not only fall within the specified timeslot of the bucket, but also have a distance between the physical locations they represent greater than a threshold distance $D_{THR}$. Note that some embodiments may also require that the pair of check-ins be within the threshold distance.

Exemplary Process

Figure 5:
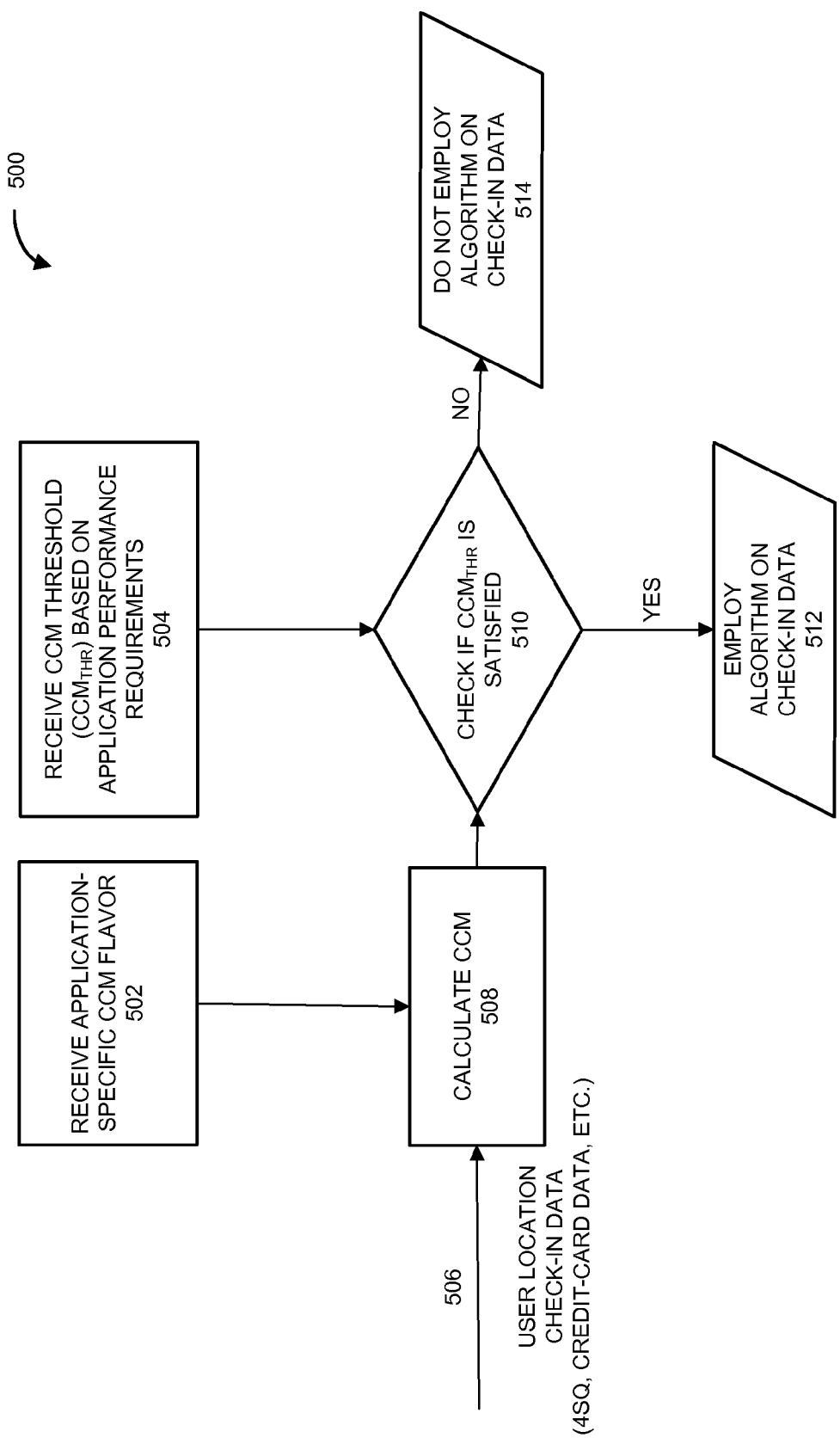
FIG. 5 presents a flowchart illustrating an exemplary process that uses CCM to control application-specific consistency, according to an embodiment.

FIG. 5 presents a flowchart illustrating an exemplary process 500 that uses CCM to control application-specific consistency, according to an embodiment. FIG. 5 illustrates using CCM for controlling the performance/error of an application by controlling the application-specific consistency of the incoming check-in data stream. System 100 uses $CCM_{THR}$ as the minimum CCM threshold to determine whether to execute an application with the data stream.

During operation, system 100 initially receives an application-specific CCM flavor (operation 502) and a CCM threshold based on application performance requirements (operation 504). A domain specialist defines the application-specific CCM flavor and the CCM threshold based on application performance requirements. The domain specialist performs operations 502 and 504 before system 100 calculates CCM. Next, system 100 receives user location check-in data (operation 506). System 100 then calculates the CCM using the user location check-in data (operation 508). System 100 determines whether $CCM_{THR}$ is satisfied (operation 510). If $CCM_{THR}$ is satisfied, system 100 employs the algorithm (operation 512). If $CCM_{THR}$ is not satisfied, system 100 does not employ the algorithm on the check-in data (operation 514). For example, $CCM_{THR}$ for the 24-hour-check-in CCM flavor may require that the number of filled buckets is at least 33% for the day. If the number of filled buckets is greater than 33%, then the threshold requirement is satisfied.

Performance Tuning

Figure 6:
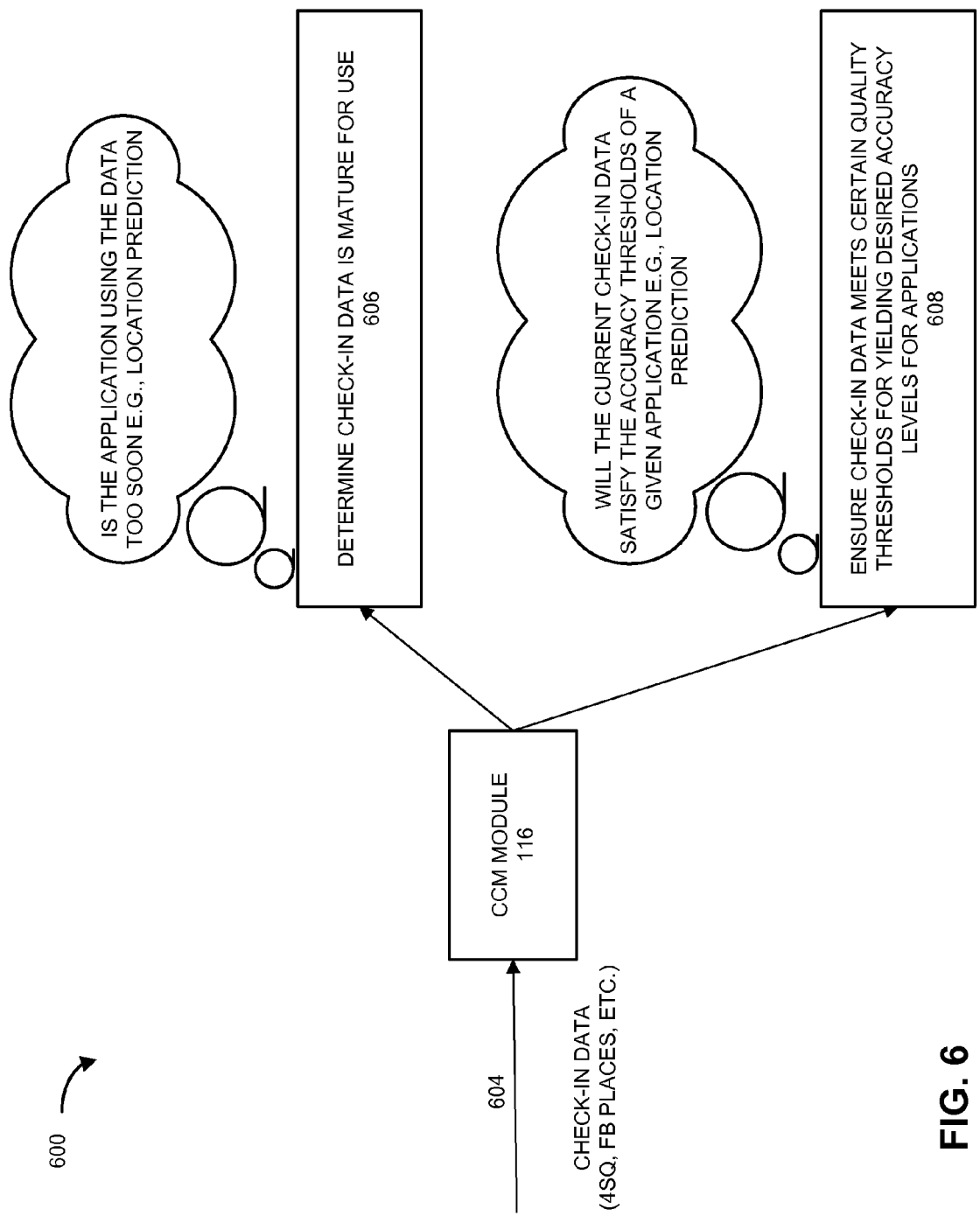
FIG. 6 presents a flowchart illustrating an exemplary process of performance tuning with CCM, according to an embodiment.

FIG. 6 presents a flowchart illustrating an exemplary process 600 of performance tuning with CCM, according to an embodiment. During operation, system 100 may receive check-in data at the CCM module 116 (operation 604). System 100 may determine whether the check-in data is mature for use (operation 606). System 100 may determine that there is an insufficient quantity of check-in data for the application and/or that the application is using the data too soon. System 100 may also ensure that the check-in data meets certain quality thresholds for yielding desired accuracy levels for applications (operation 608). Since different applications may have varying accuracy threshold requirements, system 100 ensures that the check-in data satisfies the requisite accuracy threshold.

Exemplary Process

Figure 7:
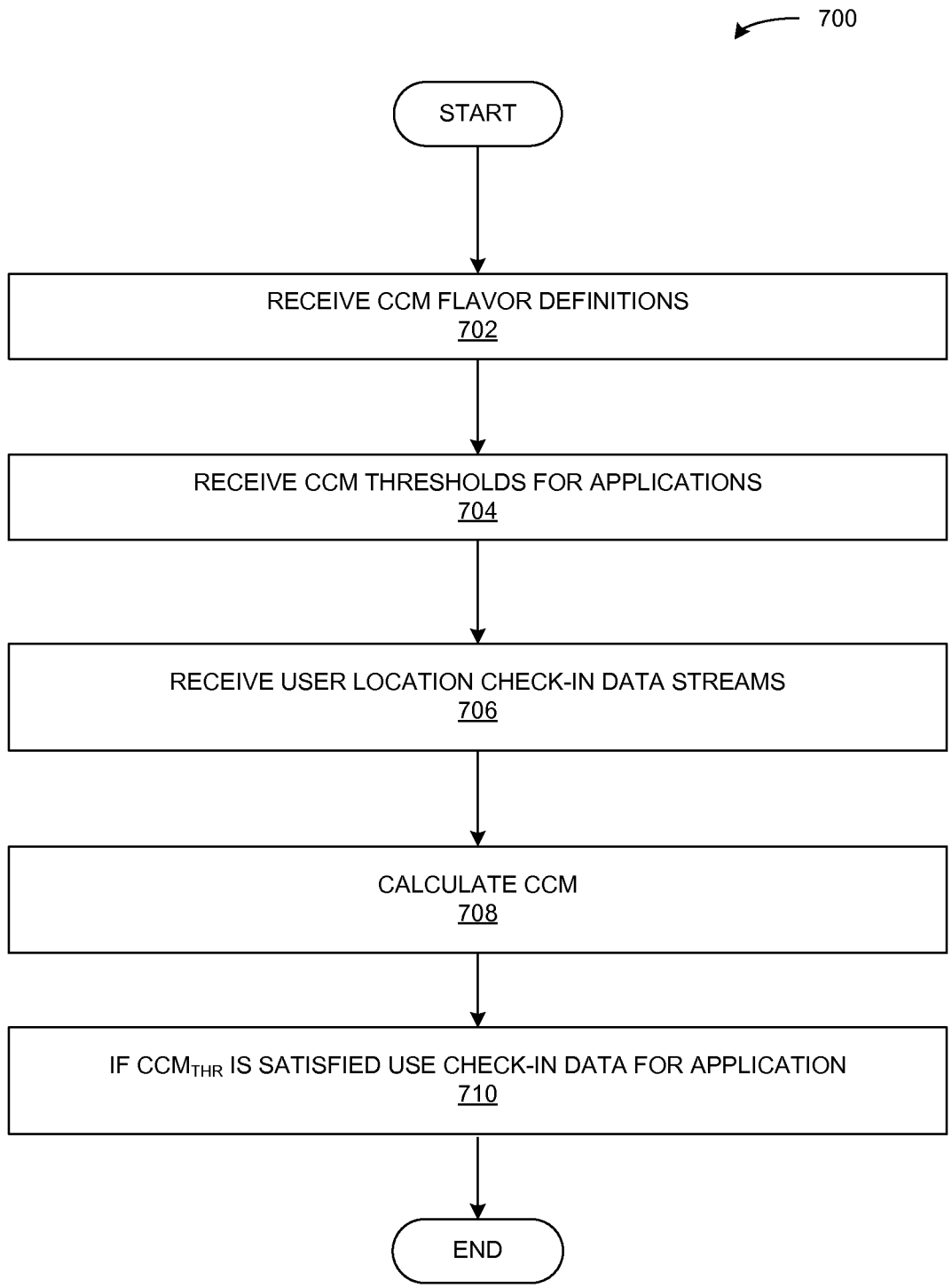
FIG. 7 presents a flowchart illustrating an exemplary process performed by a server, according to an embodiment.

FIG. 7 presents a flowchart 700 illustrating an exemplary process performed by system 100, according to an embodiment. During operation, system 100 initially receives CCM flavor definitions (operation 702). These are the check-in stream metrics for an application. System 100 also receives CCM threshold values for applications (operation 704). A domain specialist may determine the CCM flavor definitions and CCM threshold. Next, system 100 receives user location check-in data streams (operation 706). System 100 calculates CCM (operation 708), and determines whether the CCM threshold ($CCM_{THR}$) is satisfied. If $CCM_{THR}$ is satisfied system 100 then uses the check-in data for an associated application (operation 710).

Exemplary Apparatus

Figure 8:
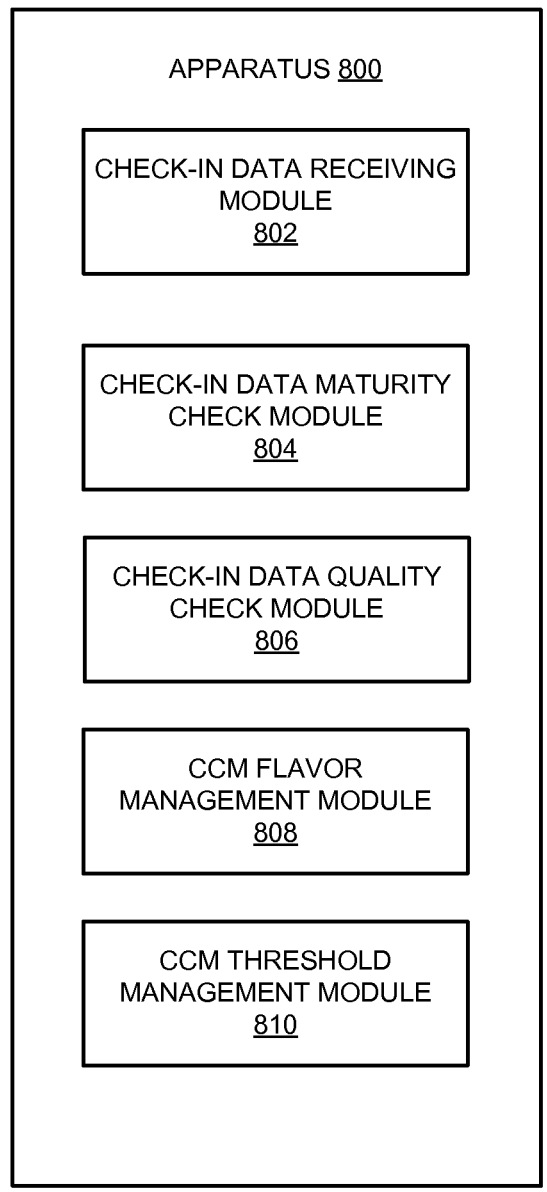
FIG. 8 illustrates an exemplary apparatus that facilitates applying CCMs, in accordance with an embodiment.

FIG. 8 illustrates an exemplary apparatus 800 that facilitates applying CCMs, in accordance with an embodiment. Apparatus 800 can comprise a plurality of modules which may communicate with one another via a wired or wireless communication channel. Apparatus 800 may be realized using one or more integrated circuits, and may include fewer or more modules than those shown in FIG. 8. Further, apparatus 800 may be integrated in a computer system, or realized as a separate device which is capable of communicating with other computer systems and/or devices. Specifically, apparatus 800 can comprise a check-in data receiving module 802, a check-in data maturity check module 804, a check-in data quality check module 806, a CCM flavor management module 808, and a CCM threshold management module 810.

In some embodiments, check-in data receiving module 802 receives the check-in data describing the location of the user. Check-in data maturity module 804 can analyze the check-in data to ensure that the data is ready for use. Check-in data quality check module 806 analyzes the quality of the check-in data to ensure that it satisfies an accuracy threshold for an application. CCM flavor management module 808 receives and manages the storage of CCM flavors. CCM threshold management module 810 stores and manages the threshold accuracy values for applications.

Exemplary Computer System

Figure 9:
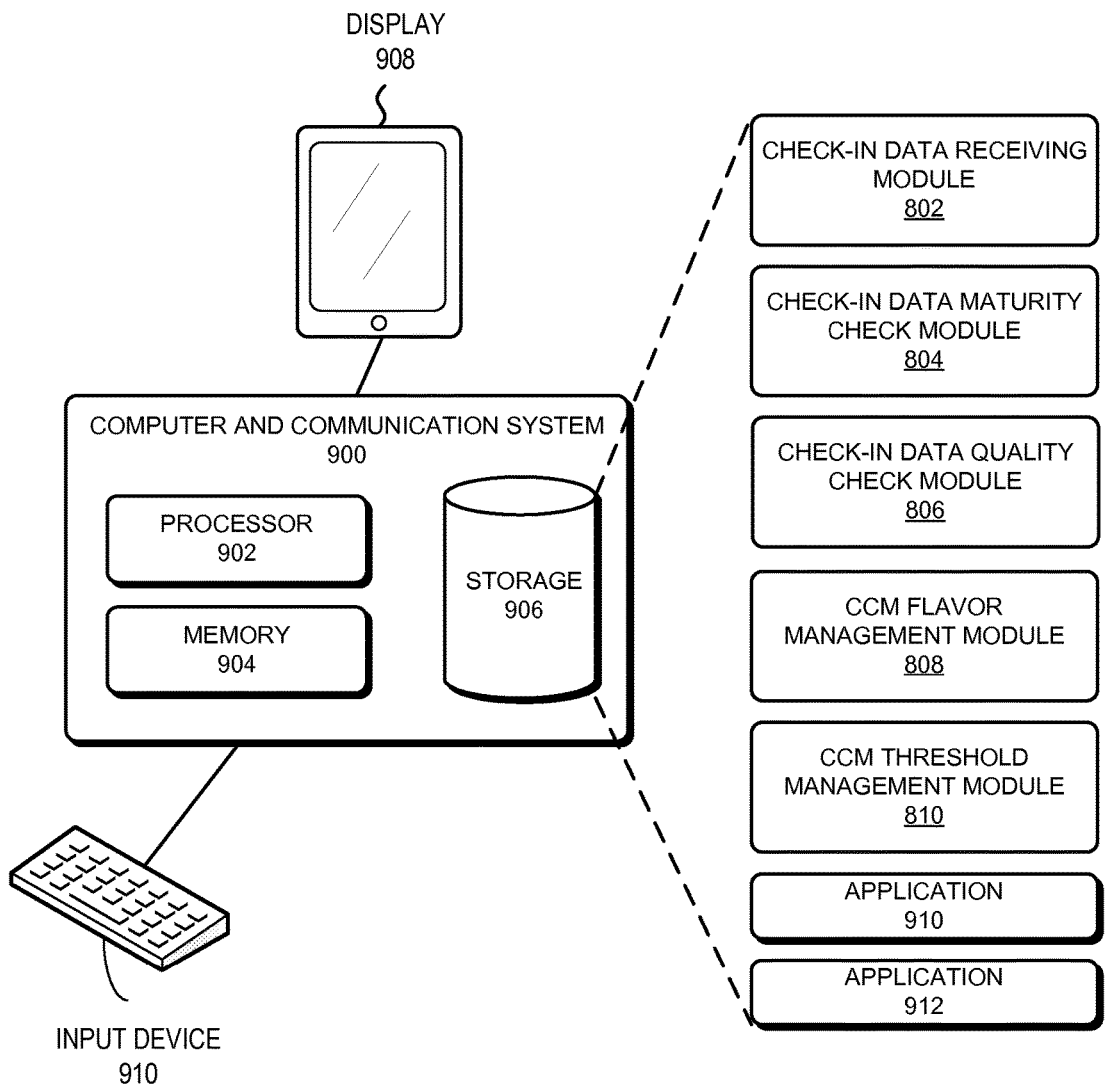
FIG. 9 illustrates an exemplary computer system that facilitates applying CCMs, in accordance with one embodiment of the present invention.

FIG. 9 illustrates an exemplary computer system that facilitates applying CCMs, in accordance with one embodiment of the present invention. In one embodiment, a computer and communication system 900 includes a processor 902, a memory 904, and a storage device 906. Storage device 906 stores a number of applications, such as applications 910 and 912. Storage device 906 also stores the check-in data receiving module 802, the check-in data maturity check module 804, the check-in data quality check module 806, the CCM flavor management module 808, and the CCM threshold management module 810. During operation, one or more applications are loaded from storage device 906 into memory 904 and then executed by processor 902. While executing the program, processor 902 performs the aforementioned functions. Computer and communication system 900 is coupled to an optional display 908 and input device 910.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-executable method for ensuring quality of a check-in stream, the check-in stream comprising a sequence of time stamps and location stamps, for use in an application that predicts or recommends an activity or location for a user, comprising: determining, by a server, based on a check-in stream consistency metric (CCM) for the application that specifies at least two time intervals in a day and a set of criteria for occupying a respective time interval, whether the check-in stream qualifies to occupy a respective time interval in a respective day;
   calculating a plurality of per-day metric values for the check-in stream, wherein a respective per-day metric value in the plurality of values is associated exclusively with a respective day of a plurality of days, and is calculated as a ratio of a number of time intervals in the respective day occupied by the stream, based on the set of criteria from the CCM, to a total number of time intervals in the day;
   determining, based on the plurality of per-day metric values, whether the check-in stream satisfies a threshold metric requirement associated with the CCM;
   in response to the check-in stream not satisfying the threshold metric requirement, requesting additional check-ins or discarding the stream; and
   in response to the check-in stream satisfying the threshold metric requirement, executing the application, by the server, using the check-in stream to generate a prediction or recommendation, and sending, to a mobile device associated with the user, the prediction or recommendation generated by the application.

2. The method of claim 1, wherein the check-in stream consistency metric specifies a set of venue categories appropriate to a respective time interval, and the set of criteria specify that a check-in stream qualifies to occupy the respective time interval if the stream contains a check-in matching a venue category in the set of venue categories appropriate to the respective time interval.

3. The method of claim 1, wherein the check-in stream consistency metric specifies a threshold distance, and the set of criteria specify that a check-in stream qualifies to occupy a respective time interval if the stream contains a pair of check-ins separated by at least the threshold distance.

4. The method of claim 1, wherein the check-in stream metric characterizes a period of time covering a portion of the check-in stream.

5. The method of claim 1, wherein the check-in stream metric is calculated based on one or more of a number of intervals in a day, a set of activity categories, and the distance between individual check-ins.

6. A non-transitory computer-readable storage medium storing instructions that when executed by a computer cause the computer to perform a method for ensuring quality of a check-in stream, the check-in stream comprising a sequence of time stamps and location stamps, for use in an application that predicts or recommends an activity or location for a user, the method comprising:
   determining, based on a check-in stream consistency metric (CCM) for the application that specifies at least two time intervals in a day and a set of criteria for occupying a respective time interval, whether the check-in stream qualifies to occupy a respective time interval in a respective day;

calculating a plurality of per-day metric values for the check-in stream, wherein a respective per-day metric value in the plurality of values is associated exclusively with a respective day in a plurality of days, and is calculated as a ratio of a number of time intervals in the respective day occupied by the stream, based on the set of criteria from the CCM, to a total number of time intervals in the day;

determining, based on the plurality of per-day metric values, whether the check-in stream satisfies a threshold metric requirement associated with CCM;

in response to the check-in stream not satisfying the threshold metric requirement, requesting additional check-ins or discarding the stream; and in response to the check-in stream satisfying the threshold metric requirement, executing the application using the check-in stream to generate a prediction or recommendation and sending, to a mobile device associated with the user, the prediction or recommendation generated by the application.

7. The non-transitory computer-readable storage medium of claim 6, wherein the check-in stream consistency metric specifies a set of venue categories appropriate to a respective time interval, and the set of criteria specify that a check-in stream qualifies to occupy the respective time interval if the stream contains a check-in matching a venue category in the set of venue categories appropriate to the respective time interval.

8. The non-transitory computer-readable storage medium of claim 6, wherein the check-in stream consistency metric specifies a threshold distance, and the set of criteria specify that a check-in stream qualifies to occupy a respective time interval if the stream contains a pair of check-ins separated by at least the threshold distance.

9. The non-transitory computer-readable storage medium of claim 6, wherein the check-in stream metric characterizes a period of time covering a portion of the check-in stream.

10. The non-transitory computer-readable storage medium of claim 6, wherein the check-in stream metric is calculated based on one or more of a number of intervals in a day, a set of activity categories, and the distance between individual check-ins.

11. A computing system for ensuring quality of a check-in stream, the check-in stream comprising a sequence of time stamps and location stamps, for use in an application that predicts or recommends an activity or location for a user, the system comprising:

one or more processors associated with a mobile device; and a non-transitory computer-readable medium, associated with the mobile device and coupled to the one or more processors, having instructions stored thereon that, when executed by the one or more processors, cause the one or more processors to perform operations comprising:

determining, based on a check-in stream consistency metric (CCM) for the application that specifies at least two time intervals in a day and a set of criteria for occupying a respective time interval, whether the check-in stream qualifies to occupy a respective time interval in a respective day;

calculating a plurality of per-day metric values for the check-in stream, wherein a respective per-day metric value in the plurality of values is associated exclusively with a respective day of a plurality of days, and is calculated as a ratio of a number of time intervals in the respective day occupied by the stream, based on the set of criteria from the CCM, to a total number of time intervals in the day;

determining, based on the plurality of per-day metric values, whether the check-in stream satisfies a threshold metric requirement associated with the CCM;

in response to the check-in stream not satisfying the threshold metric requirement, requesting additional check-ins or discarding the stream; and in response to the check-in stream satisfying the threshold metric requirement, executing the application using the check-in stream to generate a prediction or recommendation, and displaying, by the mobile device, the prediction or recommendation generated by the application.

12. The system of claim 11, wherein the check-in stream consistency metric specifies a set of venue categories appropriate to a respective time interval, and the set of criteria specify that a check-in stream qualifies to occupy the respective time interval if the stream contains a check-in matching a venue category in the set of venue categories appropriate to the respective time interval.

13. The system of claim 11, wherein the check-in stream consistency metric specifies a threshold distance, and the set of criteria specify that a check-in stream qualifies to occupy a respective time interval if the stream contains a pair of check-ins separated by at least the threshold distance.

14. The system of claim 11, wherein the check-in stream metric characterizes a period of time covering a portion of the check-in stream.

15. The system of claim 11, wherein the check-in stream metric is calculated based on one or more of a number of intervals in a day, a set of activity categories, and the distance between individual check-ins.

* * * * *